US007021642B2

(12) United States Patent
Sato et al.

(10) Patent No.: US 7,021,642 B2
(45) Date of Patent: Apr. 4, 2006

(54) STEERING DAMPER DEVICE FOR TWO-WHEELED VEHICLE

(75) Inventors: Shin Sato, Saitama (JP); Shogo Kanaumi, Saitama (JP); Kuniaki Wakamatsu, Saitama (JP); Hidetoshi Toyoda, Saitama (JP)

(73) Assignee: Honda Motor Co., Ltd., Tokyo (JP)

(*) Notice: Subject to any disclaimer, the term of this patent is extended or adjusted under 35 U.S.C. 154(b) by 0 days.

(21) Appl. No.: 10/864,575

(22) Filed: Jun. 10, 2004

(65) Prior Publication Data

US 2005/0017477 A1 Jan. 27, 2005

(30) Foreign Application Priority Data

Jun. 25, 2003 (JP) ............................ 2003-181634
Apr. 26, 2004 (JP) ............................ 2004-130084

(51) Int. Cl.
*B62K 21/00* (2006.01)

(52) U.S. Cl. ...................................... 280/272; 180/219

(58) Field of Classification Search ................ 180/219; 280/272

See application file for complete search history.

(56) References Cited

U.S. PATENT DOCUMENTS

| | | | | |
|---|---|---|---|---|
| 4,687,072 | A * | 8/1987 | Komuro | 180/219 |
| 5,492,033 | A * | 2/1996 | Hopey | 74/551.1 |
| 6,688,175 | B1 * | 2/2004 | Ogura et al. | 73/493 |
| 2003/0146594 | A1 * | 8/2003 | Bunya et al. | 280/272 |
| 2004/0046351 | A1 * | 3/2004 | Morgan et al. | 280/272 |
| 2005/0046141 | A1 * | 3/2005 | Goto et al. | 280/271 |

FOREIGN PATENT DOCUMENTS

| | | | |
|---|---|---|---|
| BE | 459 825 | A | 9/1945 |
| DE | 447 231 | C | 7/1927 |
| EP | 1 298 049 | A | 4/2003 |
| JP | 64-4633 | U * | 2/1989 |
| JP | 2002-284077 | A | 10/2002 |

* cited by examiner

*Primary Examiner*—Kevin Hurley
(74) *Attorney, Agent, or Firm*—Birch, Stewart, Kolasch & Birch, LLP

(57) ABSTRACT

A steering damper device for a two-wheeled vehicle presents a problem with regard to facilitating the viewability of a meter and to increase the degree of freedom of the meter in layout to bring down the center of gravity of the vehicle. A two-wheeled vehicle includes, at a front end of a main frame, a head pipe for rotatively supporting a steering shaft. At the front part of the head pipe, there is installed a meter stay for supporting a meter. Between the head pipe side and the steering shaft side there is interposed a steering damper device for restricting abrupt run-out of the handlebar. The steering damper device is arranged forward of the head pipe and below the meter stay to make effective use of the space of the vehicle and further to increase the degree of freedom of the meter in design.

20 Claims, 9 Drawing Sheets

STEERING DAMPER DEVICE FOR TWO-WHEELED VEHICLE

CROSS-REFERENCE TO RELATED APPLICATIONS

The present application claims priority under 35 USC 119 to Japanese Patent Application Nos. 2003-181634 filed on Jun. 25, 2003 and 2004-130084 filed on Apr. 26, 2004 the entire contents thereof are hereby incorporated by reference.

BACKGROUND OF THE INVENTION

1. Field of the Invention

The present invention relates to a steering damper device for a two-wheeled vehicle.

2. Description of Background Art

As a steering damper device for a two-wheeled vehicle, there is known, for example, a steering damper device arranged above a head pipe provided at the front end of a body frame. See, for example, Japanese Patent Laid-Open No. 2002-284077, Page 3–4, FIG. 2.

FIG. 2 of Japanese Patent Laid-Open No. 2002-284077 will be described with reference to the following FIG. 9. In this respect, reference numerals have been re-designated.

FIG. 9 is a sectional view showing a conventional steering damper device for a two-wheeled vehicle. A steering damper 200 is a device in which a rotating shaft 201 thereof is arranged above a head pipe 202 and a steering shaft 203 is rotatively installed on the head pipe 202. The steering damper 200 is fixed on the upper surface of an upper bracket 204 for supporting an upper portion of the front fork. The above-described rotating shaft 201 is installed on a radial arm 207 fixed to a body-side frame 206.

In a two-wheeled vehicle provided with a meter mounted forward of the head pipe 202, when the steering damper 200 is arranged above the head pipe 202, the meter is obstructed by the steering damper 200. Thus, it is conceivable that the meter is moved to a different place. However, a more legible place for the meter is limited. Thus, it becomes difficult to secure viewability of the meter and degrees of freedom of the meter in layout becomes less.

Also, since the steering damper 200 is located at a high position in the two-wheeled vehicle, a center of gravity of the vehicle becomes higher in a light-weight vehicle and it is not desirable.

Further, on the upper surface of the upper bracket 204, space for installing the steering damper 200 becomes smaller because a handlebar and switches are installed. Thus, and shape and size of the meter for allowing it to be installed are limited.

SUMMARY AND OBJECTS OF THE INVENTION

Thus, it is an object of the present invention to facilitate securing viewability of the meter and to increase the degrees of freedom of the meter in layout by improving a steering damper device for a two-wheeled vehicle and to make effective use of the space in the vehicle. In addition, the degrees of freedom in the design of the meter are increased by making the center of gravity of the vehicle lower.

According to the present invention, there is provided a two-wheeled vehicle in which at a front end of a main frame, there is installed a head pipe for rotatively supporting a steering shaft. At the front portion of the head pipe, there is installed a meter stay for supporting a meter and between the head pipe side and the steering shaft side, there is interposed a steering damper device for restricting abrupt run-out of the handlebar. The steering damper device is arranged forward of the head pipe and below the meter stay.

By arranging the steering damper device forward of the head pipe and below the meter stay it is possible to easily secure viewability of the meter without being obstructed by the steering damper device. Thus, the degrees of freedom of the meter in layout is increased.

Also, it is possible to make the center of gravity of the vehicle lower by arranging the steering damper device in a lower place than in a conventional case. Further, it is possible to make effective use of the comparatively large dead space forward of the head pipe and below the meter stay. Therefore, it is possible to increase the degrees of freedom of the meter in design such as shape and size.

According to the present invention, there is provided a steering damper device wherein the steering damper device is supported by a meter stay.

A supporting member of the steering damper device is used in common with the meter stay for supporting the meter, whereby it is possible to reduce a number of components, and to reduce the cost and weight.

According to the present invention, there is provided a steering damper device, wherein the steering damper device is equipped with a steering angle sensor for detecting a steering angle of a handlebar. The steering angle sensor is arranged at a hole portion provided at the meter stay.

It is possible to protect the steering angle sensor by the meter stay, and to enhance the reliability of the steering damper device. Also, it is possible to reduce the number of components without the need for any special protection member for protecting the steering angle sensor.

According to the present invention, there is provided a steering damper device wherein the steering damper device is installed to the steering shaft and is coupled to a bottom bridge for supporting the front fork via a link mechanism.

The steering damper device is coupled to the bottom bridge via the link mechanism, whereby if an input shaft of the steering damper device is coupled to the link mechanism, it will be possible to easily change a turning angle of the input shaft relative to an actual steering angle of the handlebar, and to enhance a degree of freedom of the design of the steering damper device.

According to the present invention, since the steering damper device is arranged forward of the head pipe and below the meter stay, it is possible to easily secure viewability of the meter without being obstructed by the steering damper device while increasing a degree of freedom of the layout of the meter.

Also, it is possible to make the center of gravity of the vehicle lower by arranging the steering damper device in a lower place than in a conventional case. Further, it is possible to make effective use of the comparatively large dead space forward of the head pipe and below the meter stay. Therefore, it is possible to increase the degrees of freedom of the meter in design such as shape and size.

According to the present invention, since the steering damper device has been supported by the meter stay, the supporting member of the steering damper device is used in common with the meter stay for supporting the meter, whereby it is possible to reduce a number of components, and to reduce the cost and weight.

According to the present invention, since the steering damper device is equipped with a steering angle sensor for detecting a steering angle of a handlebar, and this steering angle sensor has been arranged at a hole portion provided at the meter stay, it is possible to protect the steering angle sensor by the meter stay, and to enhance reliability of the steering damper device. Also, it is possible to reduce the number of components without the need for any special protection member for protecting the steering angle sensor.

According to the present invention, since the steering damper device is installed on the steering shaft and is, via a link mechanism, coupled to a bottom bridge for supporting the front fork, if an input shaft of the steering damper device is coupled to the link mechanism, it will be possible to easily change a turning angle of the input shaft relative to an actual steering angle of the handlebar, and to enhance a degree of freedom of the design of the steering damper device.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE PREFERRED EMBODIMENTS

Figure 1:
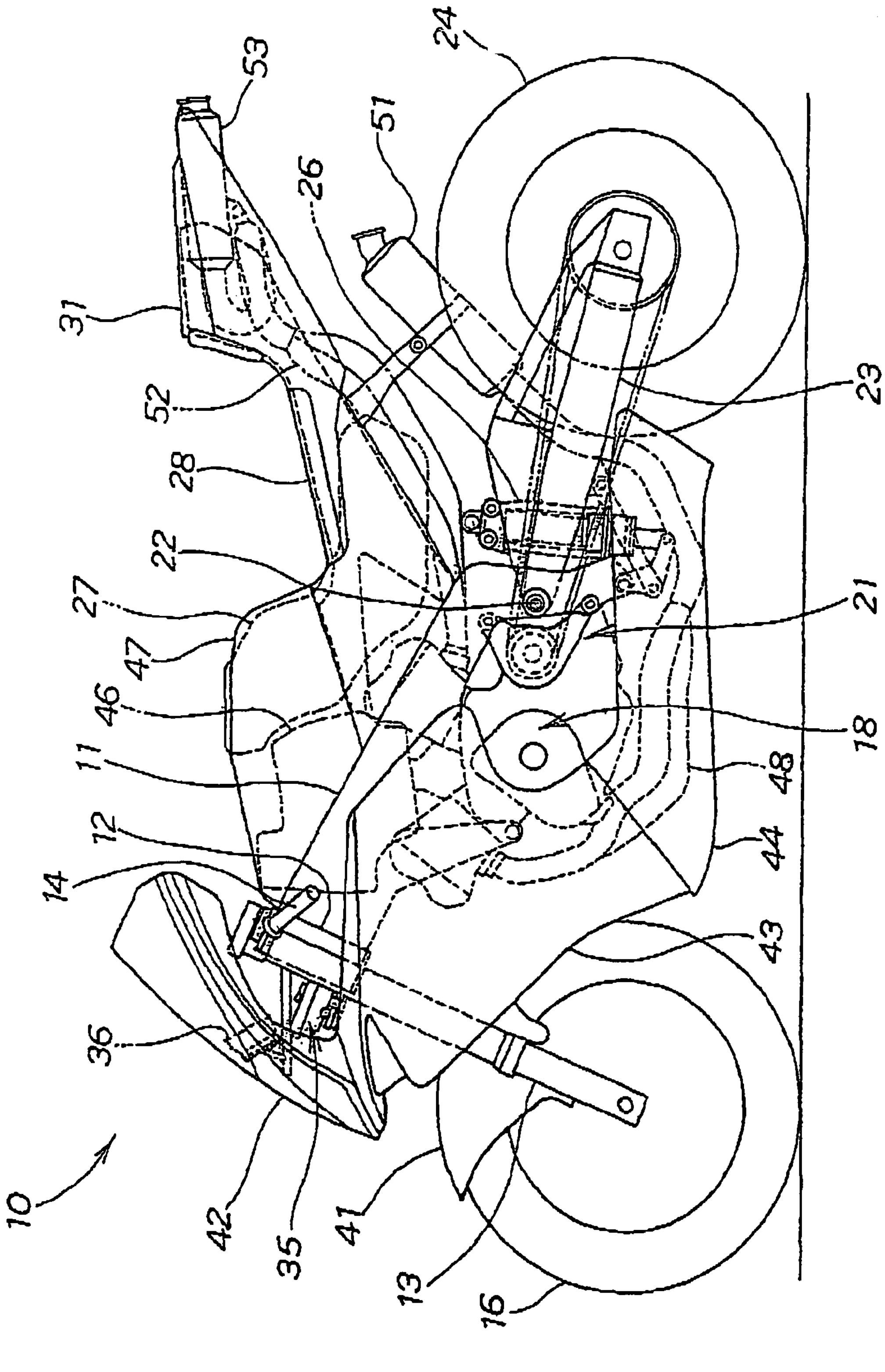
FIG. 1 is a side view showing a two-wheeled vehicle equipped with a steering damper device according to the present invention.

Hereinafter, the best mode for carrying out the present invention will be made with reference to the accompanying drawings. FIG. 1 is a side view showing a two-wheeled vehicle equipped with a steering damper device according to the present invention. A motorcycle 10 includes a body frame 11, a front fork 13 and a handlebar 14 which are installed on a steering shaft (to be described in detail later) to be rotatively supported by a head pipe 12 provided at a front end of a body frame 11. A front wheel 16 is installed on a lower end portion of the front fork 13. An engine 18 is installed on a lower part of the body frame 11 with a transmission 21 integrally installed to a rear part of the engine 18. A swing arm 23 is installed on a pivot shaft 22 provided in a rear part of the body frame 11 in such a manner as to be freely swingable in the up-and-down direction with a rear wheel 24 installed on a rear end portion of the swing arm 23. A rear shock absorber 26 is provided between the swing arm 23 and each of lower parts of the rear part of the body frame 11. A fuel tank 27 is installed on an upper part of the body frame 11 with a seat cowl 31 installed on an upper part of the body frame 11 in order to cover this fuel tank 27 and provide a seat 28.

The steering damper device 35 is arranged below the meter 36 provided forward of the head pipe 12. The steering damper device 35 is a device for preventing the handlebar from abruptly swinging, for example, when an external force is exerted on the front wheel 16 from a road surface during operation.

A front fender 41 is provided for covering the front wheel 16 with an upper cowl 42, a middle cowl 43 and a lower cowl 44. An intake air box 46 is provided with an upper cover 47 for covering the intake air box 46 and the fuel tank 27. An exhaust pipe 48 is provided for extending from a front-side cylinder of the engine 18 toward the rear with a muffler 51 for connecting to the exhaust pipe 48. An exhaust pipe 52 is provided for extending from a rear-side cylinder of the engine 18 toward the rear direction with a muffler 53 connected to the exhaust pipe 52.

Figure 2:
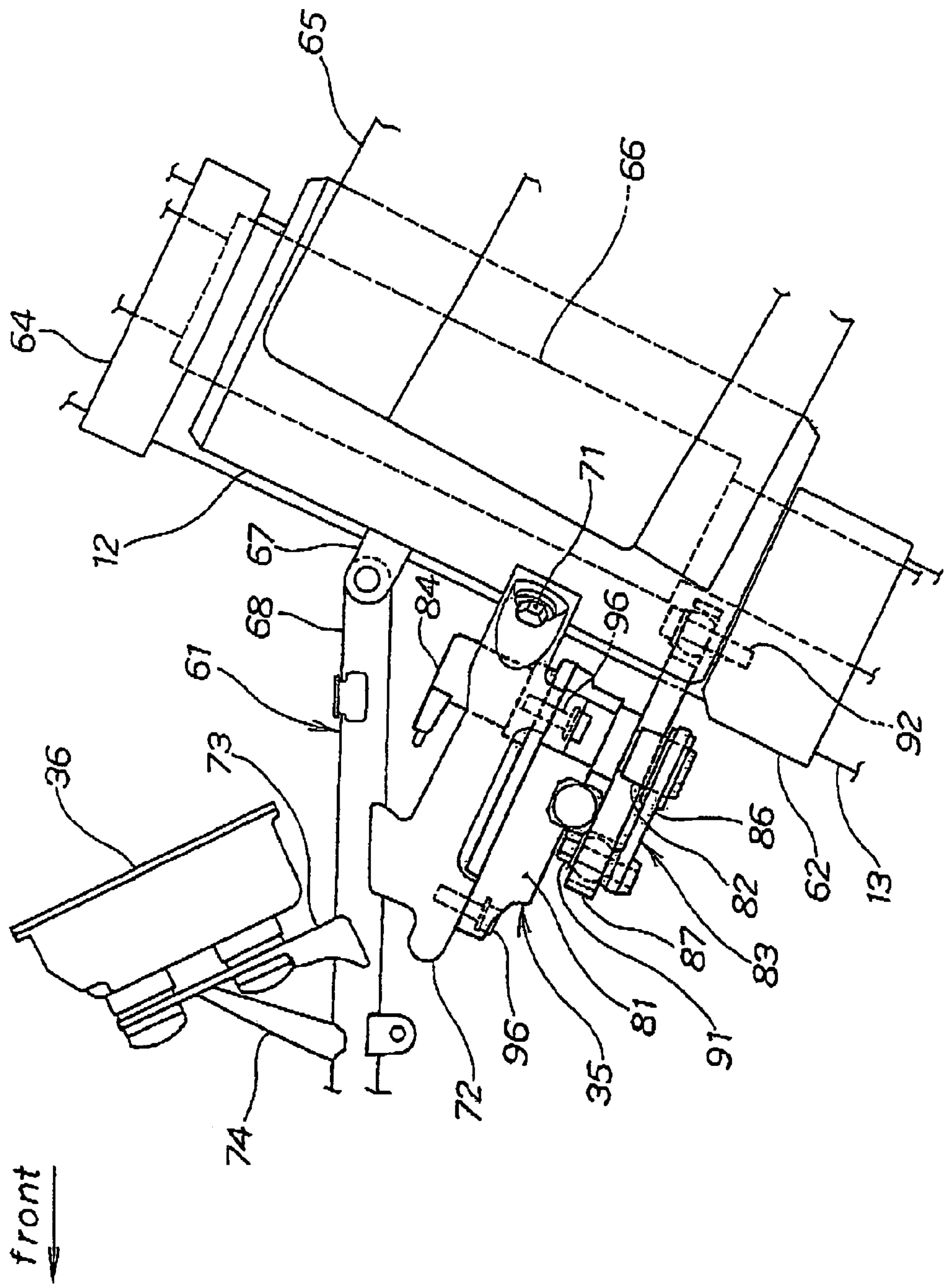
FIG. 2 is a side view showing a principal part of a two-wheeled vehicle according to the present invention.

FIG. 2 is a side view (an arrow marked front in the figure represents the front part of the vehicle) showing a principal part of a two-wheeled vehicle according to the present invention. On the front part of the head pipe 12, there is installed a meter stay 61 for supporting a meter 36. To the meter stay 61 and a bottom bridge 62 for coupling the left and right of a front fork 13, there is installed a steering damper device 35. A top bridge 64 is provided for supporting the left and right of the front fork 13 together with the bottom bridge 62. A main frame 65 (a component part of the body frame 11) is installed on the head pipe 12. A steering shaft 66 is rotatively supported by the head pipe 12 and both end portions of which are installed to the top bridge 64 and the bottom bridge 62, respectively.

The meter stay 61 includes an upper stay 68 installed on a projecting portion 67 installed on the head pipe 12 with a lower stay 72 to be integrally installed on the lower portion of an intermediate portion of this upper stay 68 and installed on the head pipe 12 with bolts 71, 71 (only reference numeral 71 on this side is shown). A supporting plate 73 is provided for directly supporting the meter 36 by extending obliquely upwardly and forward from the upper stay 68 with a stiffener 74 for reinforcing this supporting plate 73.

The steering damper device 35 includes a steering damper body 81 for exhibiting a damper function with a link mechanism 83 for coupling an input shaft 82 provided in this steering damper proper 81 to the bottom bridge 62. The steering angle sensor 84 is installed on the upper part of the steering damper body 81 in order to detect a turning angle of the input shaft 82. A control device (not shown) is provided for controlling a damper damping force of the steering damper body 81.

Figure 3:
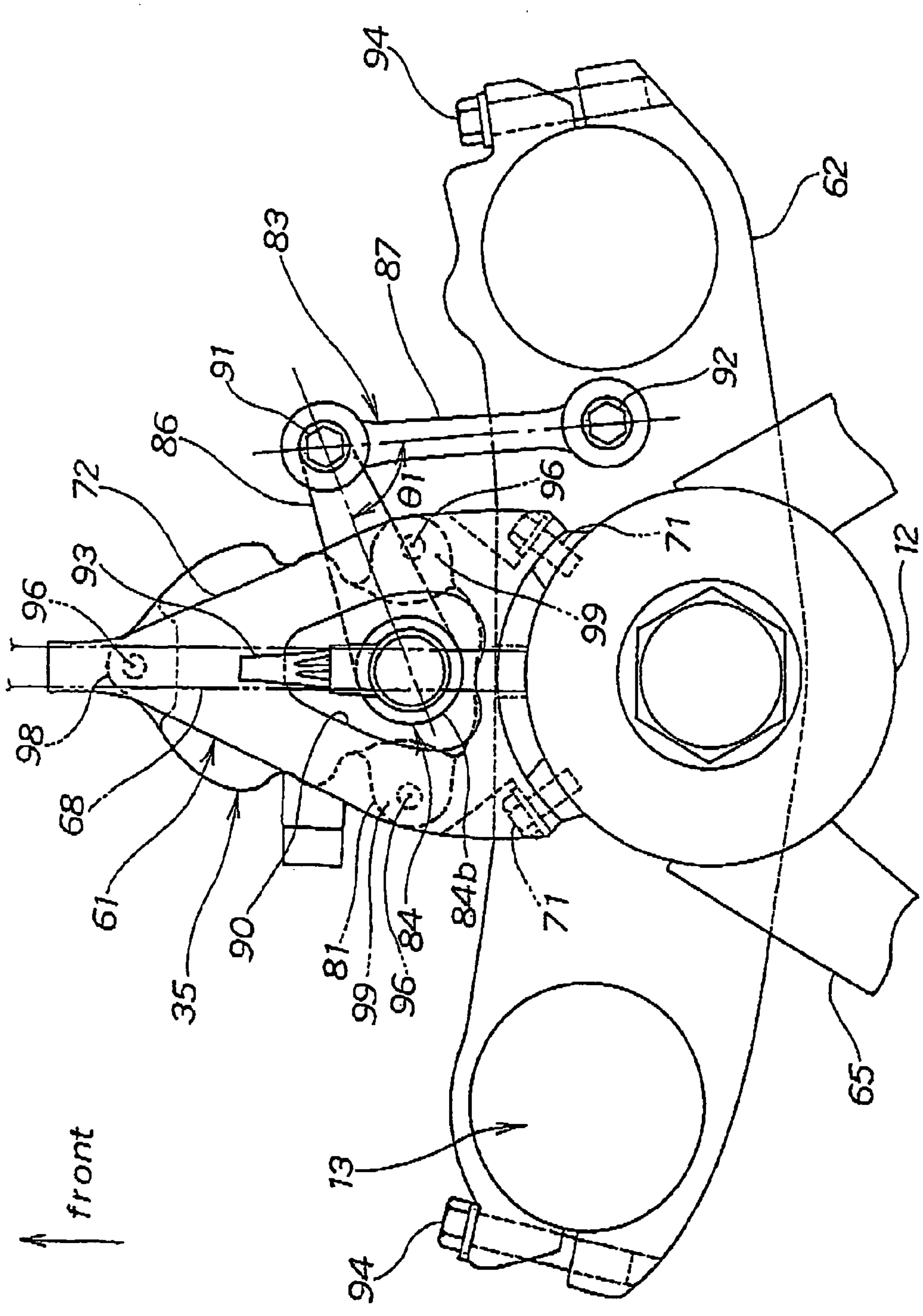
FIG. 3 is a plan view showing a principal part of a two-wheeled vehicle according to the present invention.

FIG. 3 is a plan view showing a principal part of a two-wheeled vehicle according to the present invention. A head pipe 12 is provided with a meter stay 61 installed thereon. The meter stay 61 includes a rod-shaped upper stay 68 and a substantially triangular lower stay 72. To the lower part of the lower stay 72 there is installed a steering damper device 35. In more detail, a steering damper body 81 and a steering angle sensor 84 are provided with an input shaft 82

(See FIG. 2) of the steering damper body 81 and the bottom bridge 62 is coupled through a link mechanism 83.

The link mechanism 83 consists of a first link 86 installed on the input shaft 82 and a second link 87 installed on a tip end of the first link 86 and an upper surface of the bottom bridge 62, respectively, in such a manner as to be freely swingable.

In this case, reference character θ1 designates a link angle between the first link 86 and the second link 87 when the front wheel 16 (See FIG. 1) is directed toward a direct advance direction. A through-hole portion as a substantially triangular hole portion 90 is formed in the lower stay 72 in order to reduce the weight. A bolt 91 is provided for coupling the first link 86 to the second link 87. A bolt 92 is provided for coupling the second link 87 to the bottom bridge 62. A harness 93 is provided for transmitting a steering angle signal from the steering angle sensor 84 to a control device. Bolts 94, 94 are provided for fixing the front fork 13 to the bottom bridge 62.

Hereinafter, the description will be made of detailed structure of each component part of the steering damper device 35 described above and an assembly procedure for these component parts.

Figure 4:
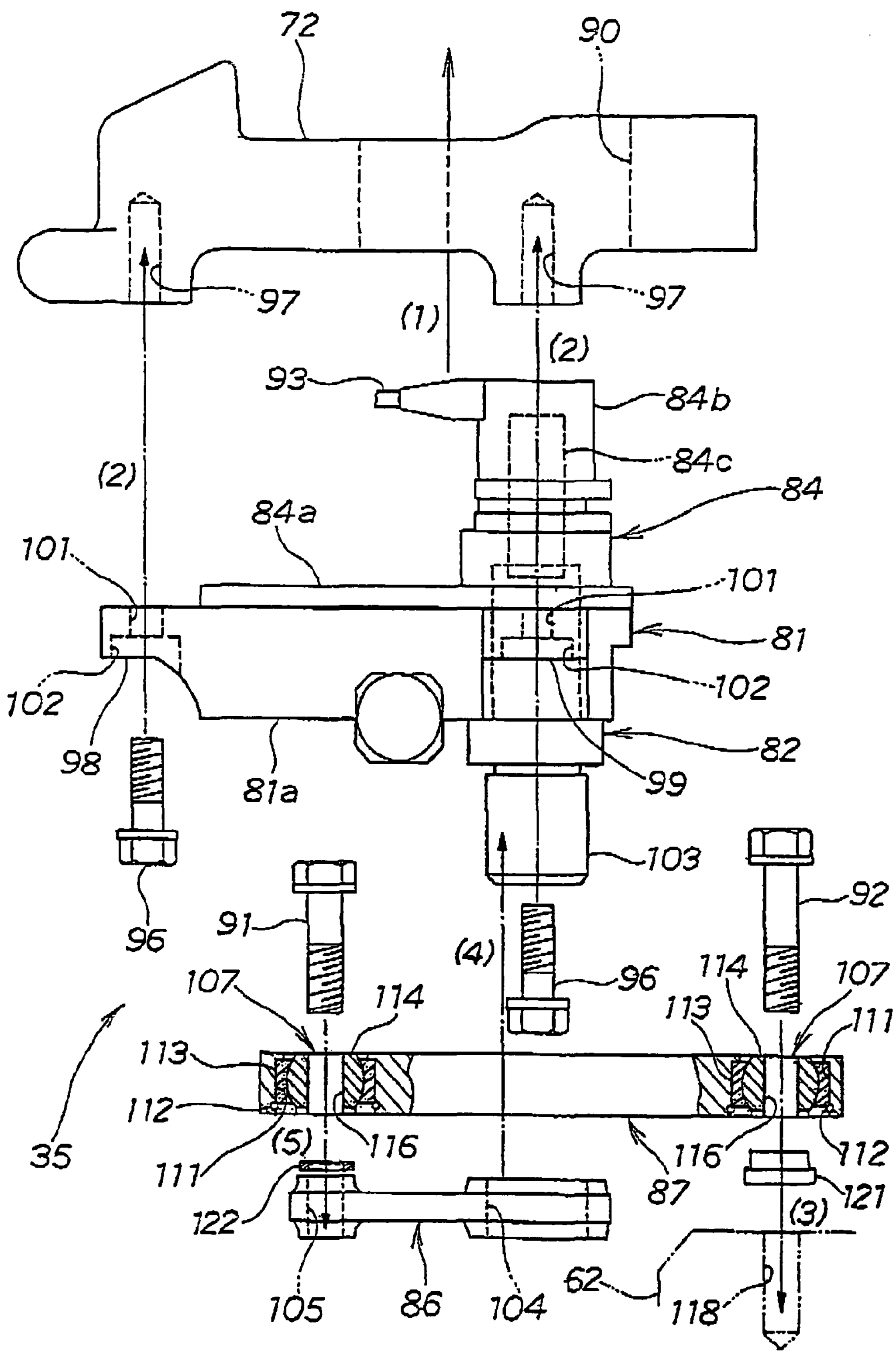
FIG. 4 is an explanatory view showing detailed structure and assembly procedure of the steering damper device according to the present invention.

FIG. 4 is an explanatory view showing the detailed structure and the assembly procedure of the steering damper device according to the present invention.

A lower stay 72 is a member formed with female thread portions 97 . . . into which bolts 96 . . . ( . . . indicates a plurality of pieces) are to be screwed.

The steering damper body 81 is a member provided with: flange portions 98, 99, 99 (only reference numeral 99 on this side is shown) to be fastened tight with bolts 96 . . . ; bolt insertion holes 101 . . . and spot facing portions 102 . . . , provided on the flange portions 98, 99, 99 in order to pass the bolts 96 . . . through. The steering damper body 81 is obtained by sealing oil within a case 81*a* made of magnesium or magnesium alloy. As described above, the case 81*a* of the steering damper body 81 is made of resin, whereby the steering damper body 81 can be made light-weight.

The steering angle sensor 84 includes a flange portion 84*a* to be installed on the steering damper body 81 with a sensor body 84*b* for projecting upwardly from this flange portion 84*a* and the above-described harness 93. The steering angle sensor 84 is obtained by coupling an end portion of the sensor shaft 84*c* that is rotatively provided within the sensor body 84*b* to the input shaft 82.

The first link 86 has a fitting hole 104 for fitting in a tip end portion 103 of the input shaft 82, and a female thread portion 105 into which the bolt 91 is screwed.

The second link 87 is a member provided with a spherical plain bearing 107 on a portion for coupling to each of the first link 86 and the bottom bridge 62.

The spherical plain bearing 107 includes an outer race 113 which is fitted in an installation hole 111 formed on the second link 87 that and is prevented from coming off with a ring 112 and an inner race 114 which is slidably fitted in this outer race 113. A bolt 91 or a bolt 92 is passed through a through-hole 116 formed in the inner race 114.

The bottom bridge 62 has on the upper surface, a female thread portion 118 for installing the second link 87. In this respect, an installation seat 121 is provided which becomes a seat when installing the second link 87 to the bottom bridge 62.

Next, the description will be made of the assembly procedure in order. In this respect, a parenthesized number shown in the figures corresponds to the following parenthesized number.

In a state in which the steering angle sensor 84 has been installed on the steering damper body 81, the upper portion of the steering angle sensor 84 is passed through a through-hole portion 90 in the lower stay 72.

(2) Bolts 96 . . . are passed through the bolt insertion holes 101 . . . in the steering damper body 81, and are screwed into female thread portions 97 . . . provided in the lower stay 72 whereby assemblies of the steering damper body 81 and the steering angle sensor 84 are installed to the lower stay 72.

(3) One end of the second link 87 is touched to the upper surface of the bottom bridge 62 via an installation seat 121 and the bolt 92 is passed through a through-hole 116 in the spherical plain bearing 107 and the bolt 92 is screwed into the female thread portion 118 of the bottom bridge 62, whereby the second link 87 is installed on the bottom bridge 62 in such a manner as to be freely horizontally rotatable and to be freely swingable in the up-and-down direction.

(4) A fitting hole 104 in the first link 86 is fitted into a tip end portion 103 in the input shaft 82, (5) a bolt 91 is passed through a through-hole portion 116 in the spherical plain bearing 107 and the bolt 91 is screwed into the female thread portion 105 in the first link 86 via a washer 122, whereby the second link 87 is installed on the first link 86 in such a manner as to be freely horizontally rotatable and to be freely swingable in the up-and-down direction.

Figure 5B:
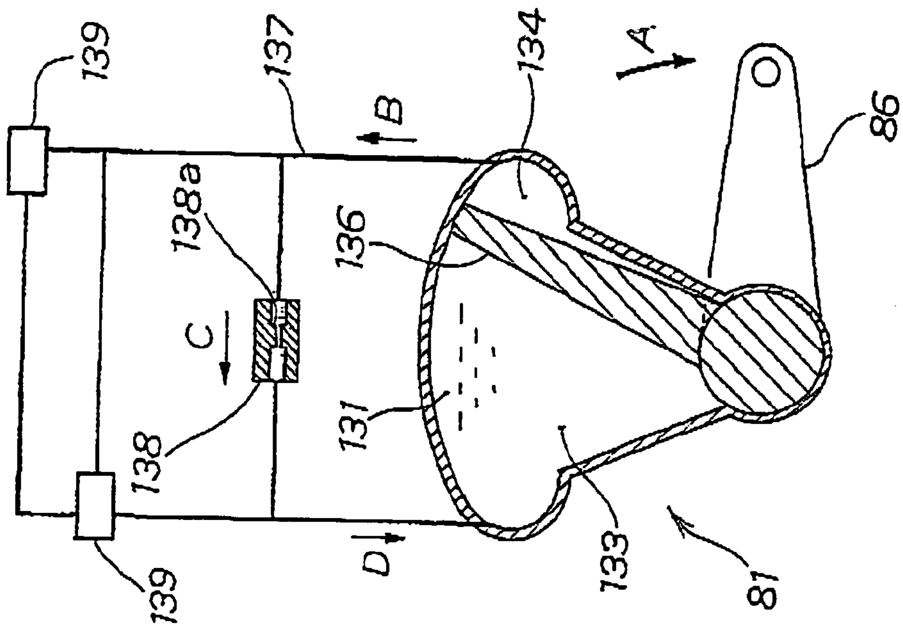
FIGS. 5(*a*) and 5(*b*) are working views showing the principle of the steering damper device according to the present invention.
Figure 5A:
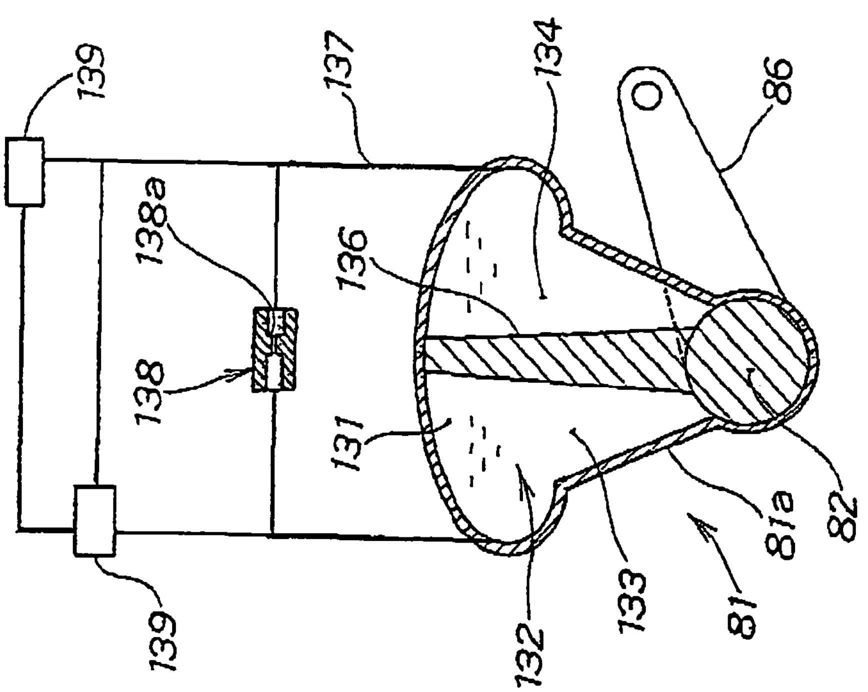

FIGS. 5(*a*) and 5(*b*) are working views showing the principle of the steering damper device according to the present invention. The following is a simple explanation of the principle of the operation.

In FIG. 5(*a*), a steering damper body 81 has a liquid chamber 132 filled with oil 131 within the case 81*a*. The interior of the liquid chamber 132 is partitioned into a first chamber 133 and a second chamber 134 with a movable partition wall 136 which swings within the liquid chamber 132 being installed on the input shaft 82. The first chamber 133 and the second chamber 134 are caused to communicate with each other through a communication path 137 and this communication path 137 is provided with an orifice formation member 138.

The orifice formation member 138 is a member in which there is provided an orifice 138*a* which reduces a path of oil passing through the interior.

In FIG. 5(*b*), when an external force is exerted on the front wheel from, for example, a road surface; a force for steering the front wheel to the right is transmitted to the first link 86 via the front fork, the bottom bridge, and the second link; and the first link 86 swings in a direction indicated by an arrow A. The movable partition wall 136 swings integrally with the first link 86. Oil 131 within the second chamber 134 of the steering damper body 81 passes through a communication path 137 within the orifice formation member 138 and reaches within the first chamber 133 as indicated by arrows B, C and D.

At this time, since the path for the oil 131 is reduced by the orifice 138*a*, resistance occurs in a flow of the oil 131 to swing the movable partition wall 136. Therefore, a high rotating force for rotating the input shaft becomes necessary. Accordingly, the steering operation is not affected.

In the above-described description of the principle of the steering damper device, there has been shown the orifice formation member 138 with the inner diameter of the orifice 138*a* fixed. In the present invention, however, the orifice diameter is made variable, for example, the orifice diameter is controlled by the control device on the basis of a steering angle obtained by detecting with the steering angle sensor, whereby a damping force of the steering damper device is adjusted. Also, so as not to generate more than a fixed damping force, there are installed relief valves 139 . . . for bypassing the orifice formation member 138.

Figure 6A:
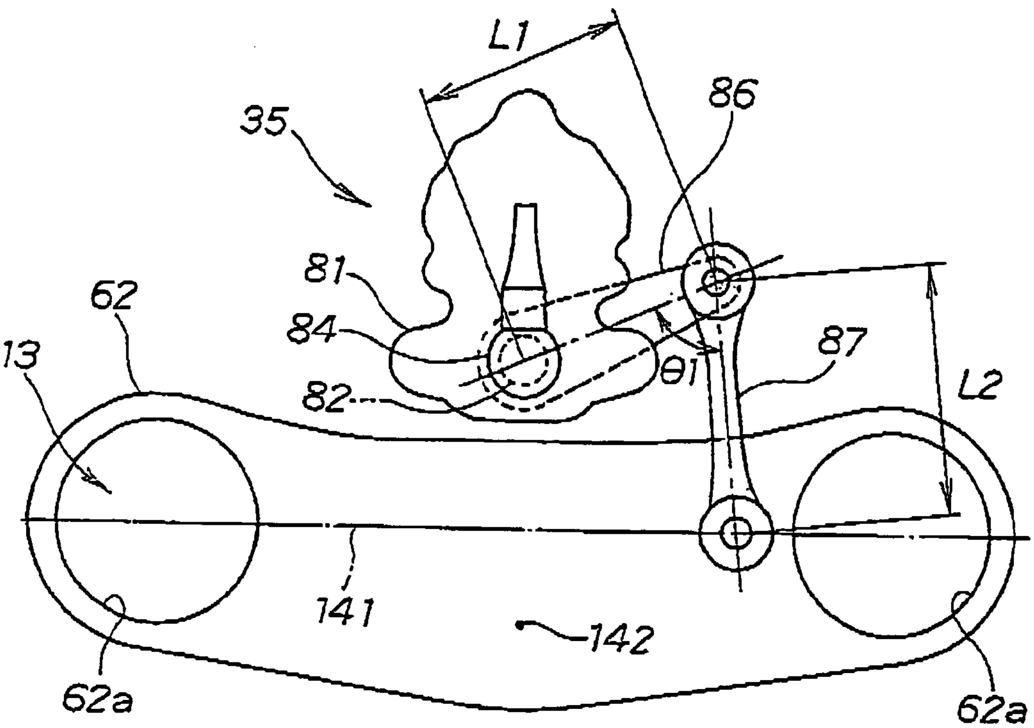
FIGS. 6(*a*) and 6(*b*) are working views showing an operation of the steering damper device according to the present invention.
Figure 6B:
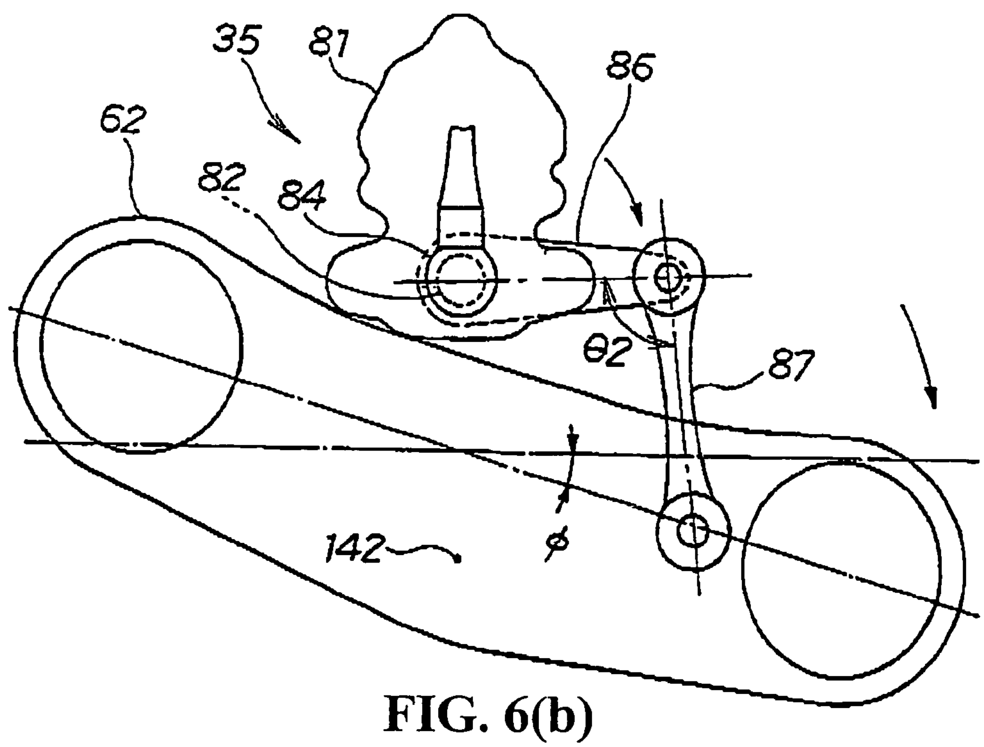

FIGS. 6(*a*) and 6(*b*) are working views showing an operation of the steering damper device according to the present invention.

FIG. 6(*a*) is a view showing a state before the steering damper device 35 operates.

At this time, the front wheel is in a state for facing forward of the vehicle, and a straight line 141 for connecting the centers of hole portions 62*a*, 62*a* for installing the front fork of the bottom bridge 62 is in a direction perpendicular to the front part of the vehicle, that is, it is in a state facing the widthwise direction of the two-wheeled vehicle.

Here, it is assumed that the installation length of the first link 86 is L1 and the installation length of the second link 87 is L2.

In FIG. 6(*b*), when steering, for example, to the right, the bottom bridge 62 rotates by an angle $\phi$ (this angle $\phi$ is a steering angle of the handlebar) with a center of rotation 142 as a center in a clockwise direction from the state of FIG. 6(*a*) accordingly. Thereby, the second link 87 and the first link 86 swing and a link angle between the first link 86 and the second link 87 becomes $\theta 2$.

In FIG. 6(*a*), if, by changing, for example, at least one of the installation length L1 of the first link 86 and the installation length L2 of the second link 87, or a position of an installation area of the second link 87 onto the bottom bridge 62, the link angle $\theta 1$ is set to 90°, a turning angle (or angular velocity of rotation of the input shaft 82 relative to angular velocity of rotation of the bottom bridge 62) of the input shaft 82 relative to a steering angle $\phi$ of the handlebar can be maximized. If the link angle $\theta 1$ is set larger or smaller so as to become apart from 90° conversely, a turning angle (or angular velocity of rotation of the input shaft 82 relative to angular velocity of rotation of the bottom bridge 62) of the input shaft 82 relative to a steering angle $\phi$ of the handlebar can be further made smaller.

Also, the above-described link angle is not limited to setting to 90° in the state of FIG. 6(*a*), but can be set to 90° at a predetermined steering angle $\phi$.

Figure 7:
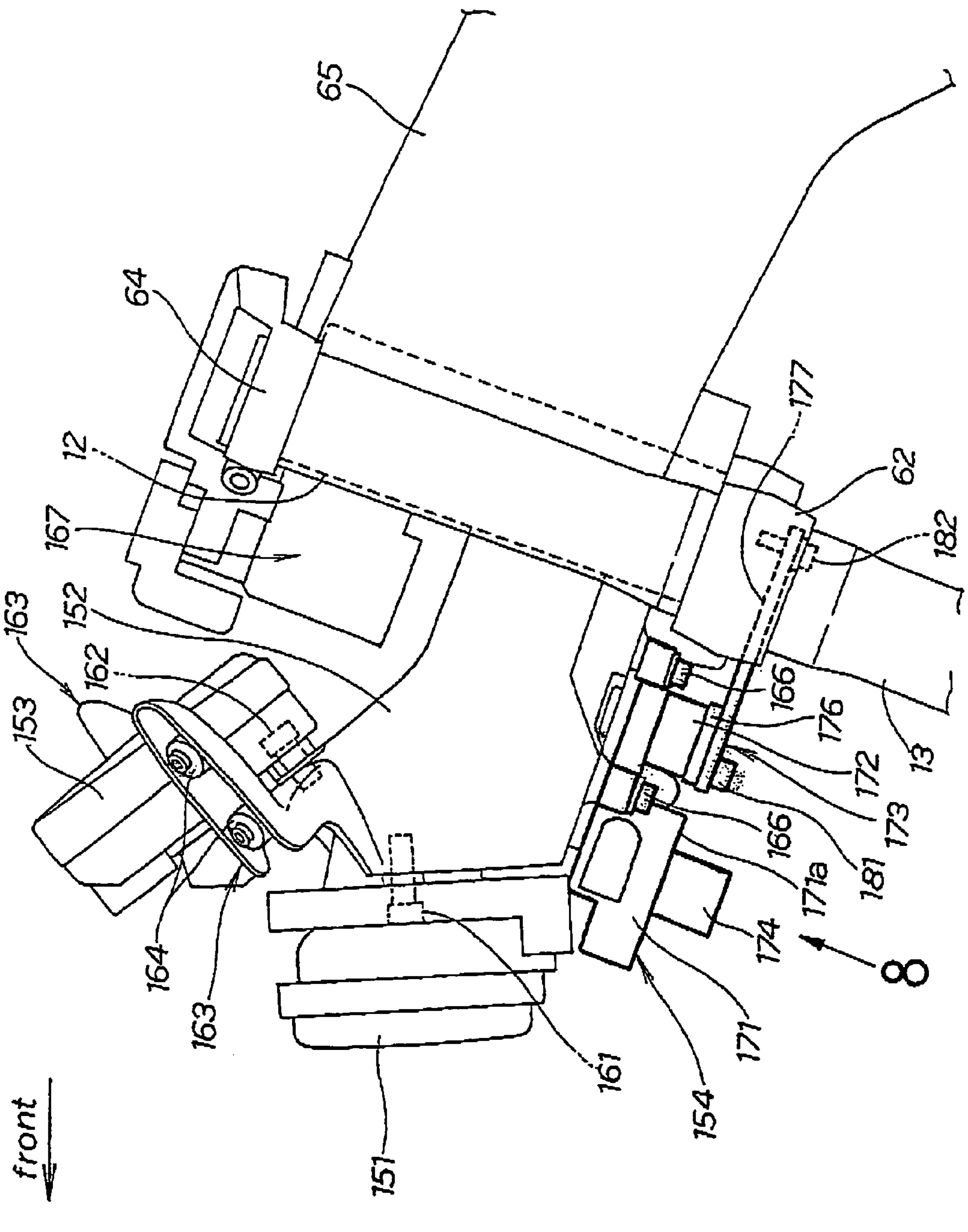
FIG. 7 is a side view of a principal part showing a steering damper device (another embodiment) for a two-wheeled vehicle according to the present invention.

FIG. 7 is a side view of a principal part showing a steering damper device (another embodiment) for a two-wheeled vehicle according to the present invention. In the front part of the head pipe 12, there is installed a headlight stay 152 for supporting the headlight 151 with a meter 153 and an upper cowl 42 (See FIG. 1) being supported by the headlight stay 152. Between the headlight stay 152 and a bottom bridge 62 for coupling the left and right front forks 13, there is installed the steering damper device 154 (portions indicated by a thick line), that is, there is provided the steering damper device 154 below the headlight stay 152. (In this respect, parts identical to those in the embodiment shown in FIGS. 2 and 3 are designated by the identical reference numerals and a detailed description thereof will be omitted.)

In FIG. 7, a plurality of (the figure shows only one piece) fixing bolts 161 are provided for fixing the headlight 151 to the headlight stay 152. A plurality of (the figure shows only one piece) fixing bolts 162 are provided for fixing the meter 153 to the headlight stay 152. A pair of left and right cowl stay portions 163, 163 are integrally provided on the headlight stay 152. A cowl installation area 164 is provided on respective cowl stay portions 163 in order to install an upper cowl 42. A plurality of (the figure shows only one piece) fixing bolts 166 are provided for fixing the steering damper device 154 to the headlight stay 152. A main switch 167 is installed on a top bridge 64.

The steering damper device 154 includes a steering damper body 171 for exhibiting a damper function with a link mechanism 173 for coupling an input shaft 172 provided on the steering damper body 171 to a bottom bridge 62. A solenoid 174 is installed on the underside 171*a* of the steering damper body 171. A control device (not shown) is provided for controlling a damper damping force of the steering damper body 171.

Figure 8:
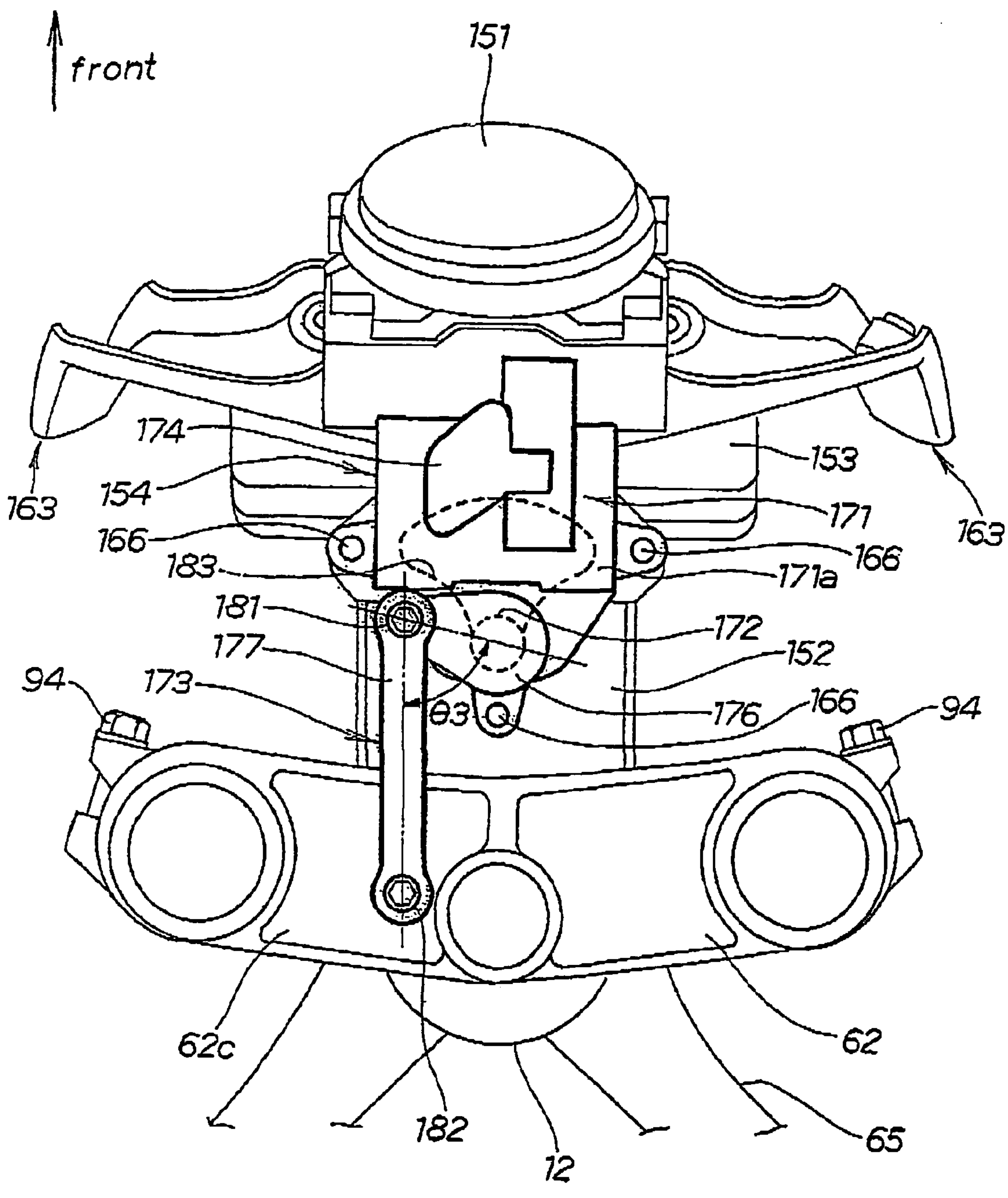
FIG. 8 is a view taken along the arrow 8 of FIG. 7.
Figure 9:
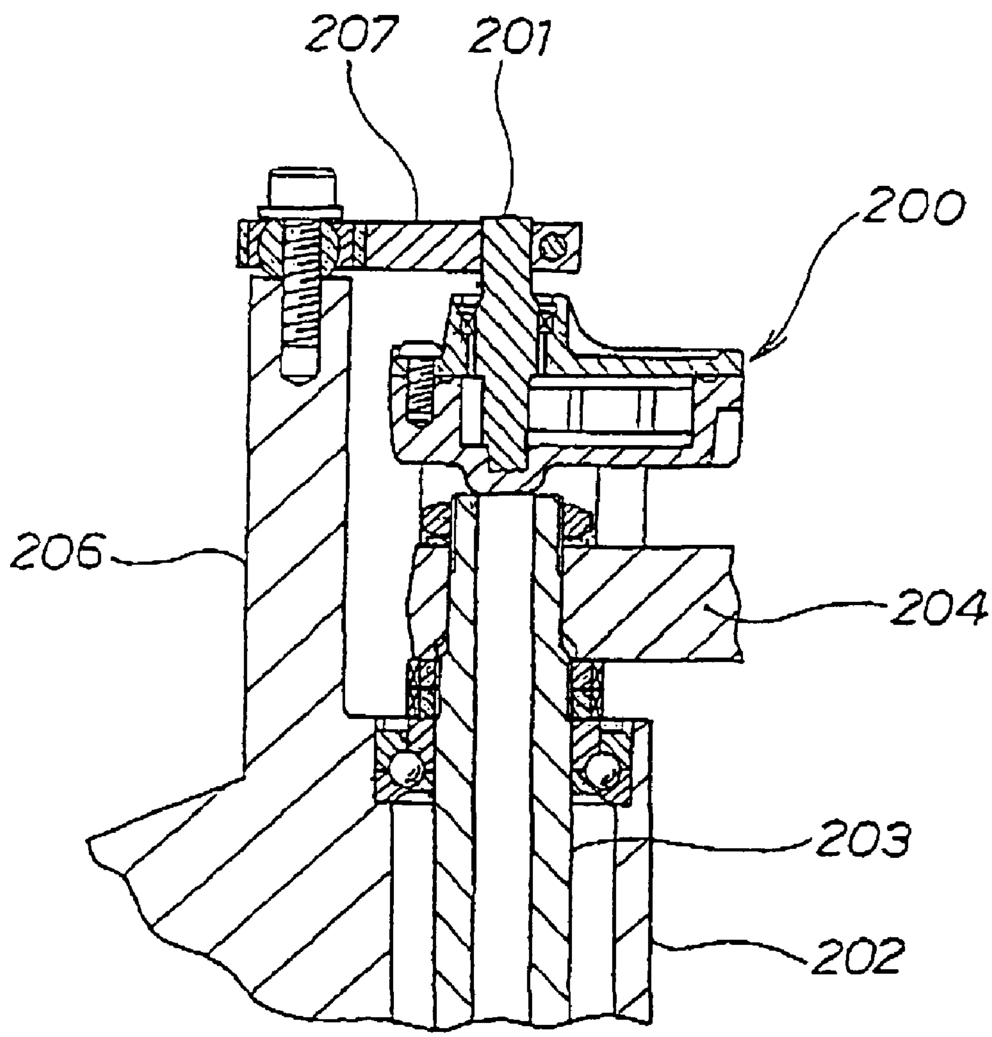
FIG. 9 is a sectional view showing a conventional steering damper device for a two-wheeled vehicle.

FIG. 8 is a view taken along the arrow 8 of FIG. 7 illustrating the lower part of the headlight stay 152 with the steering damper device 154 (portion indicated by a thick line). The steering damper body 171 is installed and the input shaft 172 of the steering damper body 171 is coupled to the bottom bridge 62 through the link mechanism 173.

The link mechanism 173 includes a first link 176 installed on the input shaft 172 and a second link 177 installed on the tip of the first link 176 and the underside 62*c* of the bottom bridge 62 in such a manner as to be freely swingable, respectively.

A link angle $\theta 3$ is provided between the first link 176 and the second link 177 when the front wheel 16 (See FIG. 1) faces the direct advance direction. A bolt 181 is provided for coupling the first link 176 to the second link 177. A bolt 182 is provided for coupling the second link 177 to the bottom bridge 62. A liquid chamber 183 (portion filled with oil) is provided within a case 171*a* of the steering damper body 171. In this respect, the operating principles of the steering damper device 154 are the same as those of the steering damper device 35 shown in FIG. 5 and a description thereof will be omitted.

As explained in FIGS. 7 and 8, since the steering damper device 156 has been provided below the headlight stay 152, it is possible to easily secure viewability of the meter 153 without being obstructed by the steering damper device 154. In addition, the degrees of freedom of design and layout of the meter 153 can be increased.

Also, the steering damper device 154 is arranged lower than in the conventional case, whereby it is possible to bring down the center of gravity of the motorcycle 10 (See FIG. 2) and to improve the driving performance. Further, it is possible to make effective use of the dead space forward of the head pipe 12 and below the headlight stay 152.

Further, since the headlight stay 152 is obtained by integrally molding and serves also as both the meter stay and the cowl stay, it is possible to reduce a number of parts and reduce the cost and the weight.

Further, since the solenoid 174 has been installed on the underside 171*a* of the steering damper body 171 in a downward direction, it is possible to prevent an interference with the headlight stay 152, and to install the steering damper device 154 in a small-sized/compact way.

Further, since the link mechanism 173 has been installed on the underside 62*c* of the bottom bridge 62, auxiliary parts and the like can be housed above the bottom bridge 62.

As described in FIGS. 2 and 3, according to the first aspect of the present invention, there is provided a two-wheeled vehicle 10 (See FIG. 1) in which at a front end of a main frame 65 there is installed a head pipe 12 for rotatively supporting a steering shaft 66. At the front part of the head pipe 12, there is installed a meter stay 61 for supporting a meter 36 and between the head pipe 12 side and the steering shaft 66 side there is interposed a steering damper device 35 for restricting abrupt run-out of the handlebar 14 (See FIG. 1). The steering damper device 35 is arranged forward of the head pipe 12 and below the meter stay 61.

The steering damper device 35 is arranged forward of the head pipe 12 and below the meter stay 61, whereby as compared with the conventional steering damper device arranged above the head pipe, according to the present invention, it is possible to easily secure viewability of the meter 36 without being obstructed by the steering damper device 35. In addition, the degree of freedom of the meter 36 in layout is increased.

Also, it is possible to make the center of gravity of the vehicle lower by arranging the steering damper device 35 in a lower place than in the conventional case for enhancing the operating performance of the two-wheeled vehicle 10. Further, it is possible to make effective use of the dead space forward of the head pipe 12 and below the meter stay 61. Thus, the space can be secured comparatively large, and therefore, it is possible to increase the degrees of freedom of the meter 35 in shape, size and the like.

The second aspect of the present invention is directed to the steering damper device 35 that is supported by a meter stay 61, in detail, a lower stay 72.

A supporting member of the steering damper device 35 is used in common with the meter stay 61 for supporting the meter 36, whereby it is possible to reduce a number of components, and to reduce the cost and weight.

The third aspect of the present invention is directed to the steering damper device 35 that is equipped with a steering angle sensor 84 for detecting a steering angle $\phi$ of a handlebar 14. This steering angle sensor 84 is arranged at a through-hole portion 90 provided at the meter stay 61.

It is possible to protect the steering angle sensor 84 by the meter stay 61, in details, to protect the sensor body 84*b* by enclosing the surroundings of the sensor body 84*b* of the steering angle sensor 84 with the lower stay 72 and covering the upper part of the sensor body 84*b* with the upper stay 68, for further enhancing reliability of the steering damper device. Also, it is possible to reduce the number of components without the need for any special protection member for protecting the steering angle sensor, and to reduce the cost and the weight.

The fourth aspect of the present invention is directed to the steering damper device 35 that is installed on the steering shaft 66 and is coupled to a bottom bridge 62 for supporting the front fork 13 via a link mechanism 83.

The steering damper device 35 is coupled to the bottom bridge 62 via the link mechanism 83, whereby if an input shaft 82 of the steering damper device 35 is coupled to the link mechanism 83, it will be possible to easily change a turning angle of the input shaft 82 relative to an actual steering angle of the handlebar 14, and to enhance a degree of freedom of the steering damper device 35 in design.

In this respect, in the present invention, the steering damper device has been supported by the meter stay, but the present invention is not limited thereto, but it may be possible to support the steering damper body of the steering damper device and the steering angle sensor by the bottom bridge or the top bridge for coupling the input shaft to the meter stay or the head pipe via the link mechanism.

The steering damper device according to the present invention is suitable for a two-wheeled vehicle.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A steering damper device for a two-wheeled vehicle in which at a front end of a main frame, there is installed a head pipe for rotatively supporting a steering shaft in a front part of the head pipe, there is stay intended to be used to mount a meter and between said head pipe and said steering shaft, there is interposed a steering damper device for restricting abrupt run-out of a handlebar comprising:

said steering damper device being arranged forward of said head pipe and below said stay, wherein a body of said steering damper body includes two liquid chambers partitioned in a right and a left direction by a movable wall.

2. The steering damper device for a two-wheeled vehicle according to claim 1, wherein said steering damper device is supported by said meter stay.

3. The steering damper device for a two-wheeled vehicle according to claim 1, wherein said steering damper device is equipped with a steering angle sensor for detecting a steering angle of said handlebar, said steering angle sensor being arranged at a hole portion provided at said meter stay.

4. The steering damper device for a two-wheeled vehicle according to claim 2, wherein said steering damper device is equipped with a steering angle sensor for detecting a steering angle of said handlebar, said steering angle sensor being arranged at a hole portion provided at said meter stay.

5. The steering damper device for a two-wheeled vehicle according to claim 1, wherein said steering damper device is installed on said steering shaft and is coupled to a bottom bridge for supporting the front fork via a link mechanism.

6. The steering damper device for a two-wheeled vehicle according to claim 2, wherein said steering damper device is installed on said steering shaft and is coupled to a bottom bridge for supporting the front fork via a link mechanism.

7. The steering damper device for a two-wheeled vehicle according to claim 3, wherein said steering damper device is installed on said steering shaft and is coupled to a bottom bridge for supporting the front fork via a link mechanism.

8. A steering damper device adapted for use with a two-wheeled vehicle having a head pipe for rotatively supporting a steering shaft positioned at a front end of a main frame and a stay intended to be used to mount a meter positioned in a front part of the head pipe comprising:

a steering damper device for restricting abrupt run-out of a handlebar, said steering damper device being interposed between the head pipe and the steering shaft; and said steering damper device being arranged forward of said head pipe and below said stay, wherein a body of said steering damper body includes two liquid chambers partitioned in a right and a left direction by a movable wall.

9. The steering damper device adapted for use with a two-wheeled vehicle according to claim 8, wherein said steering damper device is supported by said meter stay.

10. The steering damper device adapted for use with a two-wheeled vehicle according to claim 8, wherein said steering damper device is equipped with a steering angle sensor for detecting a steering angle of said handlebar, said steering angle sensor being arranged at a hole portion provided at said meter stay.

11. The steering damper device adapted for use with a two-wheeled vehicle according to claim 9, wherein said steering damper device is equipped with a steering angle sensor for detecting a steering angle of said handlebar, said steering angle sensor being arranged at a hole portion provided at said meter stay.

12. The steering damper device adapted for use with a two-wheeled vehicle according to claim 8, wherein said steering damper device is installed on said steering shaft and is coupled to a bottom bridge for supporting the front fork via a link mechanism.

13. The steering damper device adapted for use with a two-wheeled vehicle according to claim 9, wherein said steering damper device is installed on said steering shaft and is coupled to a bottom bridge for supporting the front fork via a link mechanism.

14. The steering damper device adapted for use with a two-wheeled vehicle according to claim 10, wherein said steering damper device is installed on said steering shaft and is coupled to a bottom bridge for supporting the front fork via a link mechanism.

15. A steering damper device for a two-wheeled vehicle comprising:

a head pipe;

a steering shaft rotatively supported within said head pipe, said steering shaft being positioned at a front end of a main frame;

a stay intended to be used to mount a meter, said stay being installed on said head pipe in a front part of the head pipe; and a steering damper device for restricting abrupt run-out of a handlebar, said steering damper device being interposed between said head pipe and said steering shaft and said steering damper device being arranged forward of said head pipe and below said meter stay, wherein a body of said steering damper body includes two liquid chambers partitioned in a right and a left direction by a movable wall.

16. The steering damper device for a two-wheeled vehicle according to claim 15, wherein said steering damper device is supported by said meter stay.

17. The steering damper device for a two-wheeled vehicle according to claim 15, wherein said steering damper device is equipped with a steering angle sensor for detecting a steering angle of said handlebar, said steering angle sensor being arranged at a hole portion provided at said meter stay.

18. The steering damper device for a two-wheeled vehicle according to claim 16, wherein said steering damper device is equipped with a steering angle sensor for detecting a steering angle of said handlebar, said steering angle sensor being arranged at a hole portion provided at said meter stay.

19. The steering damper device for a two-wheeled vehicle according to claim 15, wherein said steering damper device is installed on said steering shaft and is coupled to a bottom bridge for supporting the front fork via a link mechanism.

20. The steering damper device for a two-wheeled vehicle according to claim 16, wherein said steering damper device is installed on said steering shaft and is coupled to a bottom bridge for supporting the front fork via a link mechanism.

* * * * *